United States Patent
Glazer et al.

(10) Patent No.: US 11,038,955 B2
(45) Date of Patent: Jun. 15, 2021

(54) METHOD AND A SYSTEM FOR CONTROLLING MULTIMEDIA FILE ON EXTERNAL SCREEN DEVICE

(71) Applicant: Screenovate Technologies LTD., Ra'anana (IL)

(72) Inventors: Joshua Glazer, Ra'anana (IL); Sagiv Phillip, Ra'anana (IL); Amit Perelstein, Ramat Hasharon (IL)

(73) Assignee: SCREENOVATE TECHNOLOGIES LTD., Ra'anana (IL)

( * ) Notice: Subject to any disclaimer, the term of this patent is extended or adjusted under 35 U.S.C. 154(b) by 0 days.

(21) Appl. No.: 16/726,757

(22) Filed: Dec. 24, 2019

(65) Prior Publication Data
US 2020/0404048 A1    Dec. 24, 2020

Related U.S. Application Data
(60) Provisional application No. 62/865,380, filed on Jun. 24, 2019.

(51) Int. Cl.
*H04L 29/08*    (2006.01)
*G06F 16/44*    (2019.01)
(Continued)

(52) U.S. Cl.
CPC ............ *H04L 67/104* (2013.01); *G06F 9/452* (2018.02); *G06F 16/44* (2019.01); *G06F 3/0484* (2013.01)

(58) Field of Classification Search
CPC ..... H04L 67/104; G06F 9/452; G06F 3/0484; G06F 16/44
See application file for complete search history.

(56) References Cited

U.S. PATENT DOCUMENTS

| | | | |
|---|---|---|---|
| 2010/0174783 A1* | 7/2010 | Zarom | G06F 9/526 709/205 |
| 2010/0192072 A1* | 7/2010 | Spataro | G06Q 10/107 715/753 |

(Continued)

*Primary Examiner* — Roland J Casillas
(74) *Attorney, Agent, or Firm* — Browdy and Neimark, P.L.L.C.

(57) ABSTRACT

A method for controlling a multimedia file on external screen device, implemented by a processor operatively coupled to a non-transitory computer readable storage device, on which are stored modules of instruction code that when executed cause the processor to: establish P2P connection between multiple mobile/computer devices and external screen device, through communication server by using code displayed on the external screen; transferring a multimedia file from one of the mobile devices to the external device, storing the multimedia file only on volatile memory of the external device; displaying the multimedia file from local memory on the external screen using a designated application; uploading UI interface related/associated with multimedia file based on type of file or content; capturing user interaction related to the uploaded UI on each mobile device which established the P2P communication; sending captured interaction command by at least one of the mobile devices to the external screen device; each received captured command/action in turn is received by the designated application on the external screen device through the P2P connection; executing the capture commands by the designated application based on pre-defined interaction commands definitions.

18 Claims, 8 Drawing Sheets

(51) Int. Cl.
    *G06F 9/451*    (2018.01)
    *G06F 3/0484*   (2013.01)

(56) References Cited

U.S. PATENT DOCUMENTS

2014/0143672 A1* 5/2014 Kim .................... G06Q 10/101
                                                715/733
2014/0310613 A1* 10/2014 Megiddo ............... G06F 40/169
                                                715/753
2015/0350029 A1* 12/2015 Skrobotov ............. H04L 41/22
                                                715/740

* cited by examiner

Designated presentation module 200

```
Following the establishment of a P2P connection between the mobile
device 400 and the external display device 10
```

| Receiving a multimedia file with an ID through the P2P connection and saving the multimedia file at a local volatile memory of the external display device 10     212 |

↓

| Displaying the multimedia file from the local volatile memory     213 |

↓

| optionally translating/converting of file to unified/standard/vectorized file format, such as PDF format, which can be activated by a graphical software     214 |

↓

| Receiving captured control and editing commands at the external display device 10 over a P2P connection associated with file ID from each mobile device 400 that established a P2P connection     216 |

↓

| Applying control operations (e.g., page up/down Zoom) according to a captured control command received on the displayed presentation     218 |

↓

| Applying a drawing action based on captured drawing commands and recording the edited version of the presentation file including the updated drawings     220 |

↓

| Altering/modifying a presentation based on captured editing commands and recording the edited version of the presentation file including the edited changes     222 |

↓

| Activating pre-defined commands. The content file includes a triggering visual button which triggers a predefined action when clicked during the presentation of the content file, for example, the action may promote all users viewing the content file with a question enabling the user to answer and collect results at the content file     224 |

Figure 3

METHOD AND A SYSTEM FOR CONTROLLING MULTIMEDIA FILE ON EXTERNAL SCREEN DEVICE

FIELD OF THE INVENTION

The present invention relates to the field of controlling multimedia files on external screen devices. More specifically, the present invention relates to the field of controlling multimedia files within a communication network.

SUMMARY OF INVENTION

The present invention provides a method for controlling a multimedia file on external screen device, implemented by one or more processors operatively coupled to a non-transitory computer readable storage device, on which are stored modules of instruction code that when executed cause the one or more processors to perform
- managing a multimedia file on the external device which was transferred from one of the mobile devices, wherein the multimedia file is stored only on volatile memory of the external device, wherein the external device and mobile devices are in P2P communication;
- disapplying said multimedia file from local memory on the external screen using a designated application;
- uploading UI interface on the mobile device which is associated with said multimedia file based on type of file or content, upon establishing communication between mobile device with external screen device;
- capturing user interaction of uploaded UI on each mobile device;
- sending captured interaction command by at least one of the mobile devices to the external screen device;
- receiving at the external screen device captured command/action through the P2P connection; and
- executing said instructions based on pre-defined interaction commands definitions.

The present invention provides a method for controlling a multimedia file on external screen device, implemented by one or more processors operatively coupled to a non-transitory computer readable storage device, on which are stored modules of instruction code that when executed cause the one or more processors to perform
- Establishing P2P connection between multiple mobile/computer devices and external screen device, through communication server by using code displayed on the external screen;
- Transferring a multimedia file from one of the mobile devices to the external device, storing the multimedia file only on volatile memory of the external device; and disapplying said multimedia file from local memory on the external screen using a designated application;
- Uploading UI interface related/associated with multimedia file based on type of file or content;
- Capturing user interaction related to the uploaded UI on each mobile device which established P2P communication with external;
- Sending captured interaction command by at least one of the mobile devices to the external screen device;
- Each received captured command/action turn received by the designated application on the external screen device through the P2P connection
- executing said capture commands by the designated application based on pre-defined interaction commands definitions.

Transferring content file from mobile device (smart phone, tablet or laptop) of originator user to external remote device (e.g., smart TV, PC) using web RTC communication platform (or other P2P communication platform), the file is stored only on volatile memory at the remote device using browsing application or dedicated application, enabling the mobile device to control the content file presentation on the remote device, enabling other users with mobile devices to connect through the WEB RTC platform sharing the presentation of the content file and control the file presentation (optionally transfer their files) at the external device, further enabling to edit content file on external device volatile memory by any user connected to the external device through the web RTC communication platform.

Enabling to send back the edited content file to the originating user and optionally to other connected users (optionally based on originator user authorization).

The connection to the remote device can be authenticated using barcode scanned on the screen of the external device message or with hyperlink sent by one of the users Additional Properties:
1) The content file includes triggering visual button which triggers a predefined action when clicked during the presentation of the content file, for example, the action may promote all users viewing the content file with question enabling the user to answer and collect results at the content file.
2) Mapping location of user mobile device, by identifying orientation of barcode image scanning
3) The external device is an electronic billboard, enabling any user viewing the billboard to connect the content file on the board, enabling interaction such as replying to poll, or connecting earphone of the user enabling to listen to the content playing on the board The present invention, provides a method for controlling a multimedia file on external screen device, implemented by one or more processors operatively coupled to a non-transitory computer readable storage device, on which are stored modules of instruction code that when executed cause the one or more processors to perform
- managing a multimedia file on the external device which was transferred from at least one of the mobile devices, wherein the multimedia file is stored only on volatile memory of the external device, wherein the external device and mobile devices are in P2P communication;
- disapplying said multimedia file from local memory on the external screen using a designated application;
- uploading UI interface on the mobile device which is associated with said multimedia file based on type of file or content, upon establishing communication between mobile device with external screen device;
- capturing user interaction of uploaded UI on each mobile device;
- sending captured interaction command by at least one of the mobile devices to the external screen device;
- receiving at the external screen device captured command/action through the P2P connection; and
- executing said instructions based on pre-defined interaction commands definitions.

According to some embodiments of the present invention the method further comprising the step translating/conservation of file to unified/standard/vectorized file format which can activate by graphical software.

According to some embodiments of the present invention the executing said capture commands include applying controlling operation (page up/down. Zoom) according to captured control command on the displayed presentation According to some embodiments of the present invention the method the executing said capture commands include Altering/modifying presentation based on captured editing commands and recording the edited version of the presentation file including the edited changes/

According to some embodiments of the present invention the executing said commands include drawing action based on captured drawings commands and recording the edited version of the presentation file including the edited changes According to some embodiments of the present invention the content file includes triggering visual button which triggers a predefined action when clicked during the presentation of the content file According to some embodiments of the present invention the action promote all users viewing the content file with question enabling the user to answer and collect user answers at the content file.

According to some embodiments of the present invention the visual button has predefined format, wherein the predefined format include data which indicates the type of questions to sent to the client and optional answers.

According to some embodiments of the present invention the virtual content is scanned applying OCR process for identifying the virtual button content.

The present invention provides A system for controlling a multimedia file on external screen device, implemented by one or more processors operatively coupled to a non-transitory computer readable storage device, on which are stored modules of instruction code that when executed cause the one or more processors to perform Management module on the external device for managing a multimedia file which was transferred from one of the mobile device, wherein the multimedia file is stored only on volatile memory of the external device, wherein the external device and mobile devices are in P2P communication;

wherein the managing include disapplying said multimedia file from local memory on the external screen using a designated application;

UI interface of at least one mobile device which is related/associated with said multimedia file based on type of file or content, said interface is uploaded upon establishing communication between the at least one mobile device with external screen device a;

wherein the UI interface captures user interaction related to the uploaded UI on each mobile device, sending captured interaction command by at least one of the mobile devices to the external screen device;

wherein each received captured command/action in turn is received by the designated management application on the external screen device through the P2P connection; and executed based on pre-defined interaction commands definitions.

According to some embodiments of the present invention the multimedia file is translated to a unified/standard/vectorized file format which can activate by graphical software.

According to some embodiments of the present invention the executing of said capture commands include applying controlling operation (page up/down. Zoom) according to captured control command on the displayed presentation According to some embodiments of the present invention the executing of said capture commands include Altering/modifying presentation based on captured editing commands and recording the edited version of the presentation file including the edited changes.

According to some embodiments of the present invention the executing of said commands include drawing action based on captured drawings commands and recording the edited version of the presentation file including the edited changes According to some embodiments of the present invention the content file includes triggering visual button which triggers a predefined action when clicked during the presentation of the content file According to some embodiments of the present invention the action promote all users viewing the content file with question enabling the user to answer and collect user answers at the content file.

v the visual button has predefined format, wherein the predefined format include data which indicates the type of questions to sent to the client and optional answers.

According to some embodiments of the present invention the virtual content is scanned applying OCR process for identifying the virtual button content.

BRIEF DESCRIPTION OF DRAWINGS

FIG. 3 is a flowchart diagram illustrating the processing of the Designated presentation module, according to some embodiments of the invention.

MODES FOR CARRYING OUT THE INVENTION

Following is a table of definitions of the terms used throughout this application.

| Term | Definition |
| --- | --- |
| Control/source commuter device | A computerized device that is capable of producing multimedia files, and is configured to transmit the said multimedia files to an external display device and transmit control commands, such as mobile phone, laptop, or tablet. |
| External display device display | A display device having communication module connected to communication network such Smart TV or computer screen |
| Content/ multimedia file | Any type of content file, presentation file, such as word, power point, video animation etc. |

In the following detailed description of various embodiments, reference is made to the accompanying drawings that form a part thereof, and in which are shown by way of illustration specific embodiments in which the invention may be practiced. It is understood that other embodiments may be utilized and structural changes may be made without departing from the scope of the present invention.

The present invention provides a method for controlling a multimedia file on an external screen device. The method is implemented by one or more processors operatively coupled to a non-transitory computer readable storage device on which are stored modules of instruction codes. When executed, such modules of instruction codes cause the one or more processors to perform at least one of the following steps:

managing a multimedia file which was transferred from one of the mobile devices on the external device, wherein the multimedia file is stored only on the volatile memory of the external device, and wherein the external device and mobile devices are in P2P communication;

disapplying said multimedia file from local memory on the external screen using a designated application;

upon establishing communication between mobile device with external screen device uploading a UI interface on the mobile device which is associated with said multimedia file based on the type of file or content;

capturing user interaction of the uploaded UI on each mobile device;

sending a captured interaction command by at least one of the mobile devices to the external screen device;

receiving, at the external screen device, the captured command/action through the P2P connection; and executing said instructions based on pre-defined definitions of interaction commands.

Figure 1:
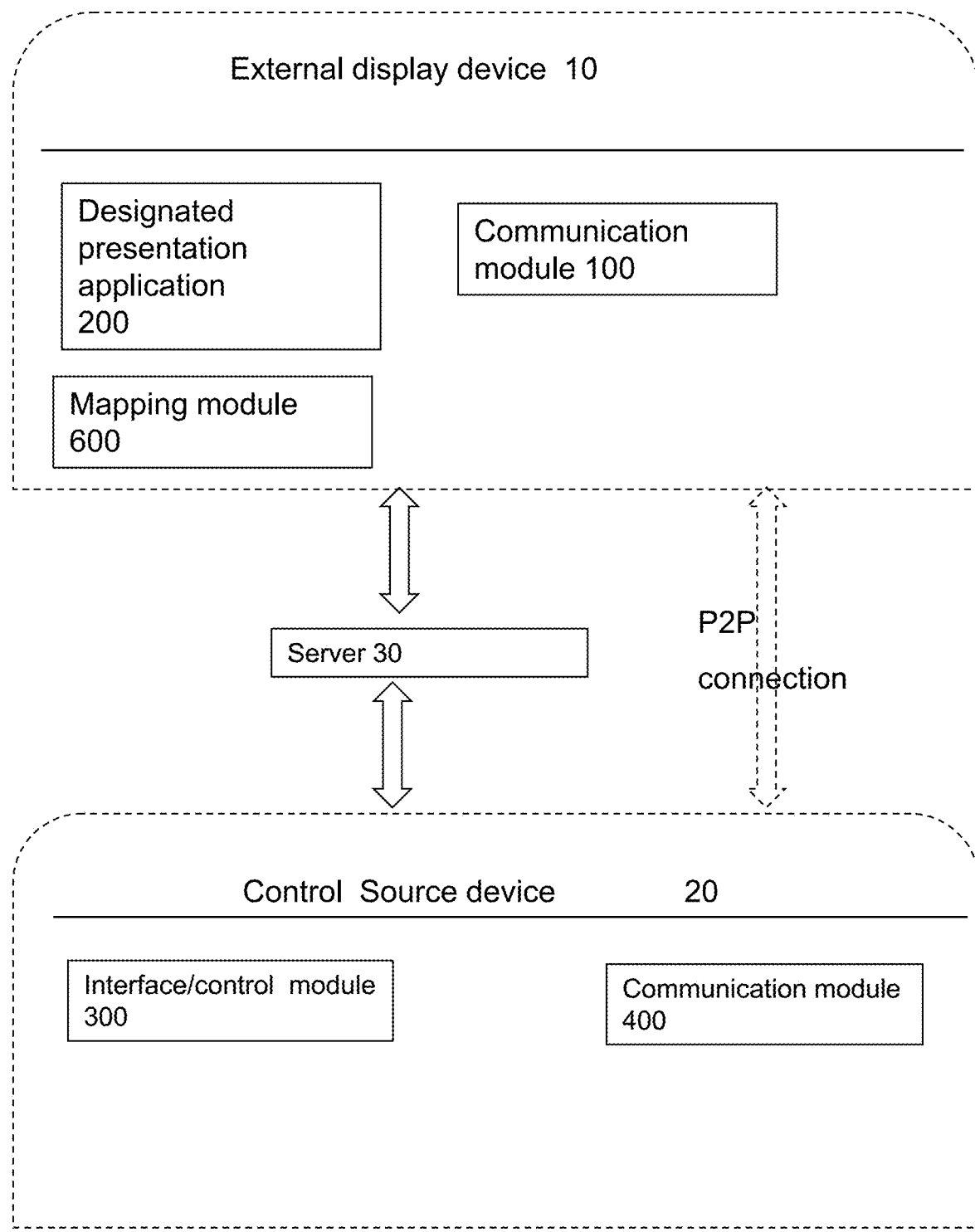
FIG. 1 is a block diagram of an external display device in communication with a source computer device though communication server, according to some embodiments of the invention.

FIG. 1 is a block diagram of an external display device 10 in communication with a control computer device 20 through a communication server 30 according to some embodiments of the invention.

The external display device 10 comprises a communication module 100, a designated presentation application 200, and a mapping module 600.

Communication module 100 is configured to establish communication between the control source device 20 and the external display device 10 and for transferring multimedia files between the devices.

Designated presentation application 200, such as a web application is used for presenting a multimedia file configured to receive editing, controlling commands from the control/source computer, and applying control and editing commands on the multimedia files.

The at least one control/source device 20 comprises:
  communication module 100 configured to establish communication between the control source device 20 and the external display device 10 and to transfer multimedia files in-between; and
  an interface/control module 300 for controlling and/or editing the presentation and the content of a multimedia file, which is presented at the external display device 10.

The communication server 30 is configured to establish communication between the control source device 20 and the external display device 10, enabling the external display device 10 by P2P connection using for example a Web RTC protocol.

According to some embodiments of the present invention, control source device 20 of a user located nearby the external display device 10 may establish communication with the external display device 10 for controlling the multimedia file.

According to some embodiments of the present invention, the external display device 10 streams back (reverse mirroring) the multimedia to the mobile devices.

According to some embodiments of the present invention, the user can establish remote connection between his mobile device and the external electronic display device 10 using a pin code or an invitation by an electronic message, such as for instance, email messages, text messages and the like.

According to some embodiments of the present invention, the remote participants that are not located at the presentation room can connect to an audio channel and hear the other participants through the P2P communication.

Figure 2:
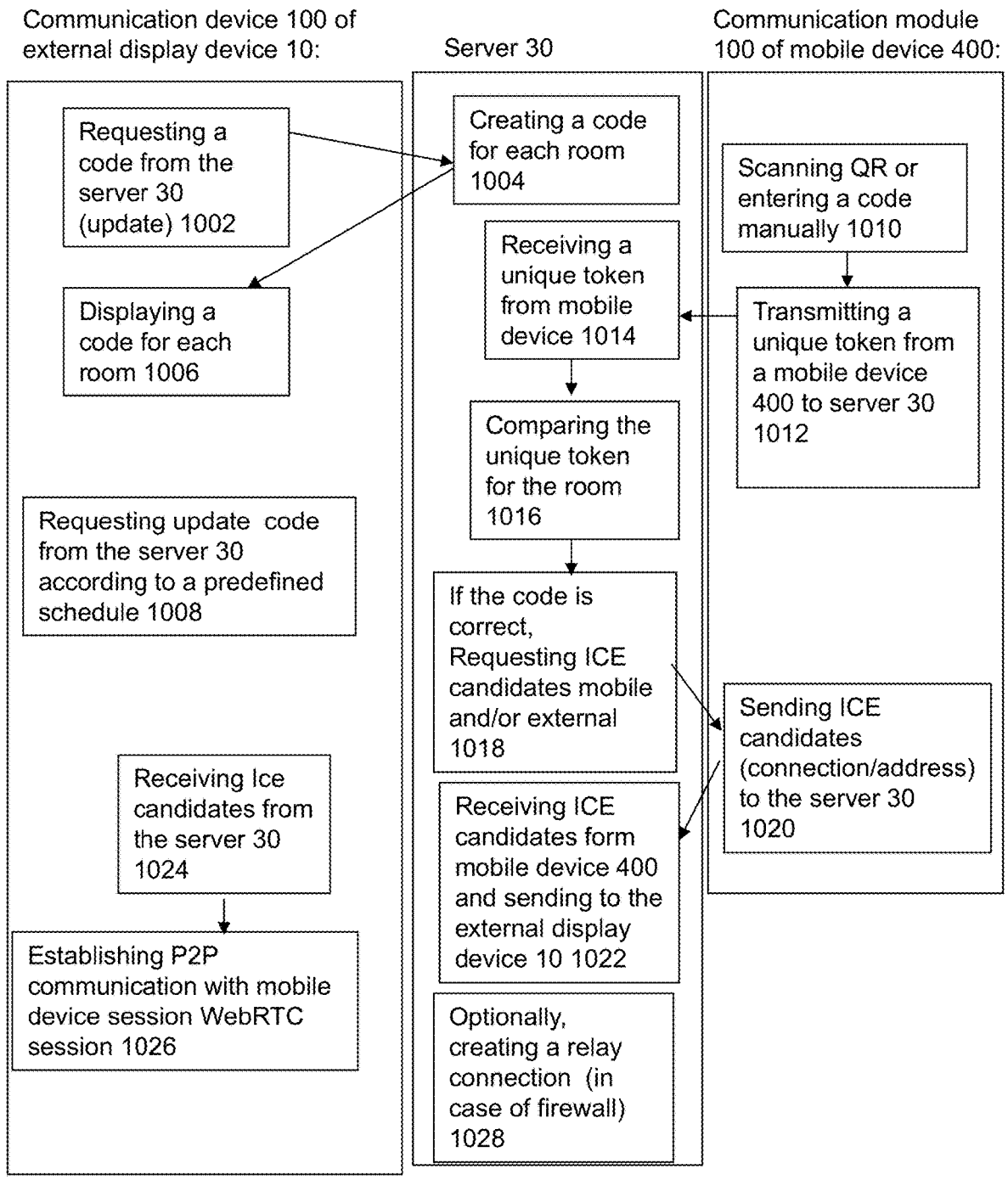
FIG. 2 is a flowchart diagram illustrating, the communication procedure according to some embodiments of the invention.

FIG. 2 is a flowchart diagram illustrating the communication procedure according to some embodiments of the invention.

The communication procedure comprises the following steps:
  Requesting a code from the server 30 by a communication device 100 of the external display device 10, the request may update the code according to predefined schedule;
  Creating a code for each room by the server 30 (1004);
  Displaying the code created for each room on the screen external display device 10 (1006);
  optionally scanning QR or entering a code manually (1010);
  optionally transmitting a unique token from mobile device 400 to server 30 (1012) and
  comparing the unique token for the room (1016);
  If the code is correct, requesting ICE candidates mobile and/or external (1018);
  Sending ICE candidates (connection/address) to the server (1020);
  Receiving ICE candidates via the mobile device 400 and sending said ICE candidates to the communication device 100 of the external display device 10 (1022);
  Receiving Ice candidates from the server 30 (1024);
  Establishing a P2P communication with mobile device 400 using a WebRTC session (1026);

FIG. 3 is a flowchart diagram illustrating the processing of the designated presentation module 200 according to some embodiments of the invention.

The processing of the Designated presentation module 200 comprises the following steps:
  Following the establishment of a P2P connection between the mobile device 400 and the external display device 10;
  Receiving a multimedia file with an ID through the P2P connection and saving the multimedia file at a local volatile memory of the external display device 10 (212). Optionally, according to other embodiments of the present invention, the file may be saved on a remote server, and may be uploaded to the external display device 10.

Figure 4:
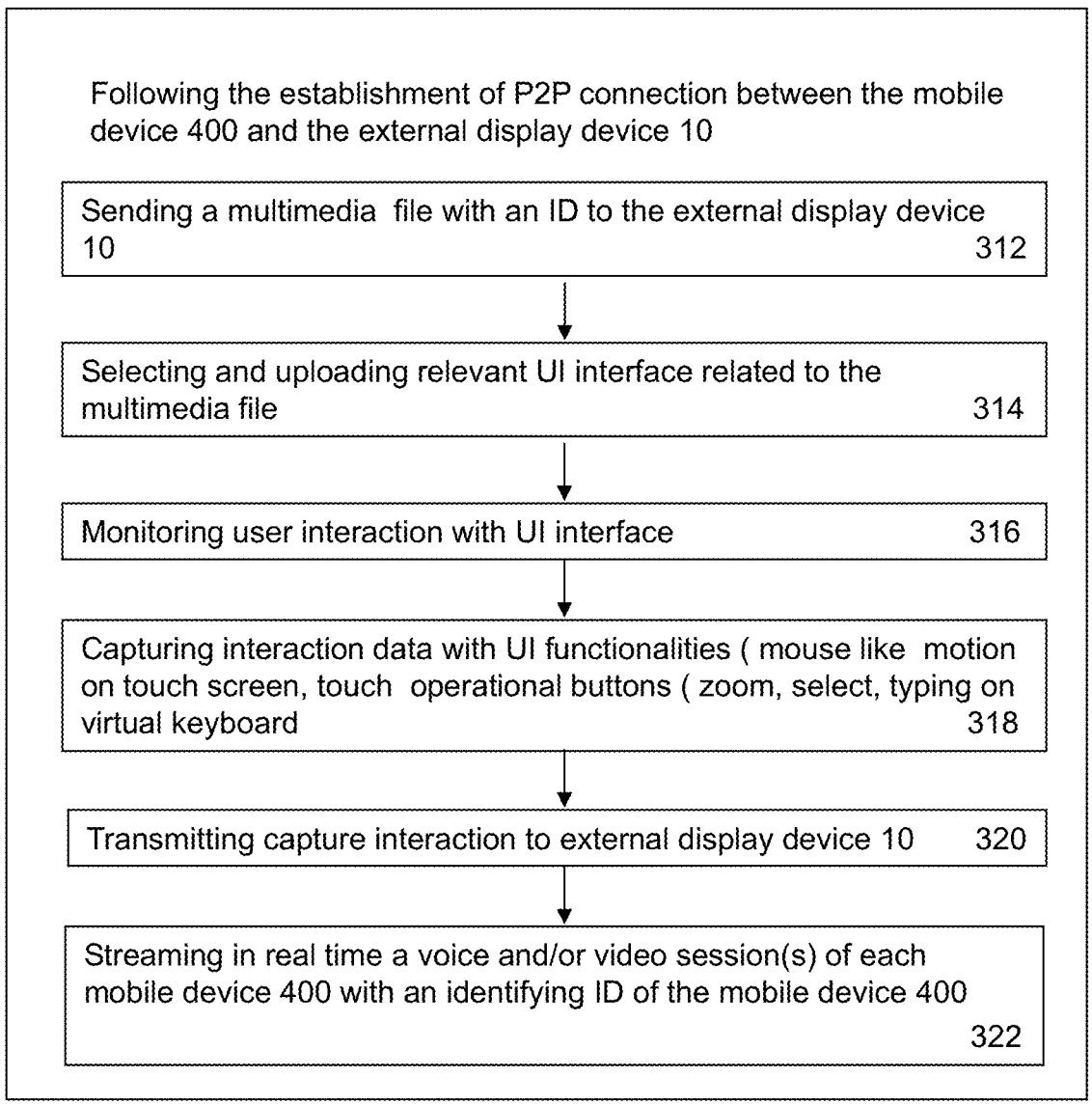
FIG. 4 is a flowchart diagram illustrating interface device module, according to some embodiments of the invention.

Displaying the multimedia file from the local volatile memory (213);

Optionally translating converting of the file to unified/standard/vectorized file format, such as PDF format which can be activated by a graphical software (214);

Receiving captured control and editing commands at the external display device 10 over a P2P connection associated with file ID from each mobile device 400 that established a P2P connection (216);

Applying control operations (e.g., page up/down Zoom) according to a captured control command received on the displayed presentation (218);

Applying a drawing action based on captured drawing commands and recording the edited version of the presentation file including the updated drawings (220);

Altering/modifying a multimedia file based on captured editing commands and recording the edited version of the presentation file including the edited changes (222);

Optionally sending the edited multimedia file to one of the mobile devices 400;

Activating pre-defined commands which are implemented in the multimedia file, such as the content of the multimedia file which includes a triggering visual button which triggers a predefined action when clicked during the presentation of the content multimedia file, for example, the action may promote all users viewing the content file with a question enabling the user to answer and collect results at the content file (224);

FIG. 4 is a flowchart diagram illustrating an interface control module 300 according to some embodiments of the invention.

The processing of the interface control module 300 comprises the following steps:

Sending a multimedia file with an ID to the external display device 10 (312);

Selecting and uploading a relevant UI interface related to the multimedia file (314);

Monitoring a user interaction with the UI interface (316);

Capturing interaction data with UI functionalities (mouse-like motion on a touch screen, touch operational buttons (zoom, select, typing on virtual keyboard (318);

Transmitting capture interaction data to external display device 10 (320);

Streaming in real time a voice and/or video session(s) of each mobile device 400 with an identifying ID of the mobile device 400 (322).

Mobile devices 400 of users (secondary users), other than the first user who originated the presentation, may join the multimedia presentation by establishing communication with the external display device 10 as disclosed in FIG. 2. The secondary users may control the presentation of the external display device 10 in the same manner as the first user, as described above in steps 314-322. When connecting the external display device 10 which already loaded the presentation, the mobile device 400 receives the type of presentation for loading the relevant UI.

Figure 5:
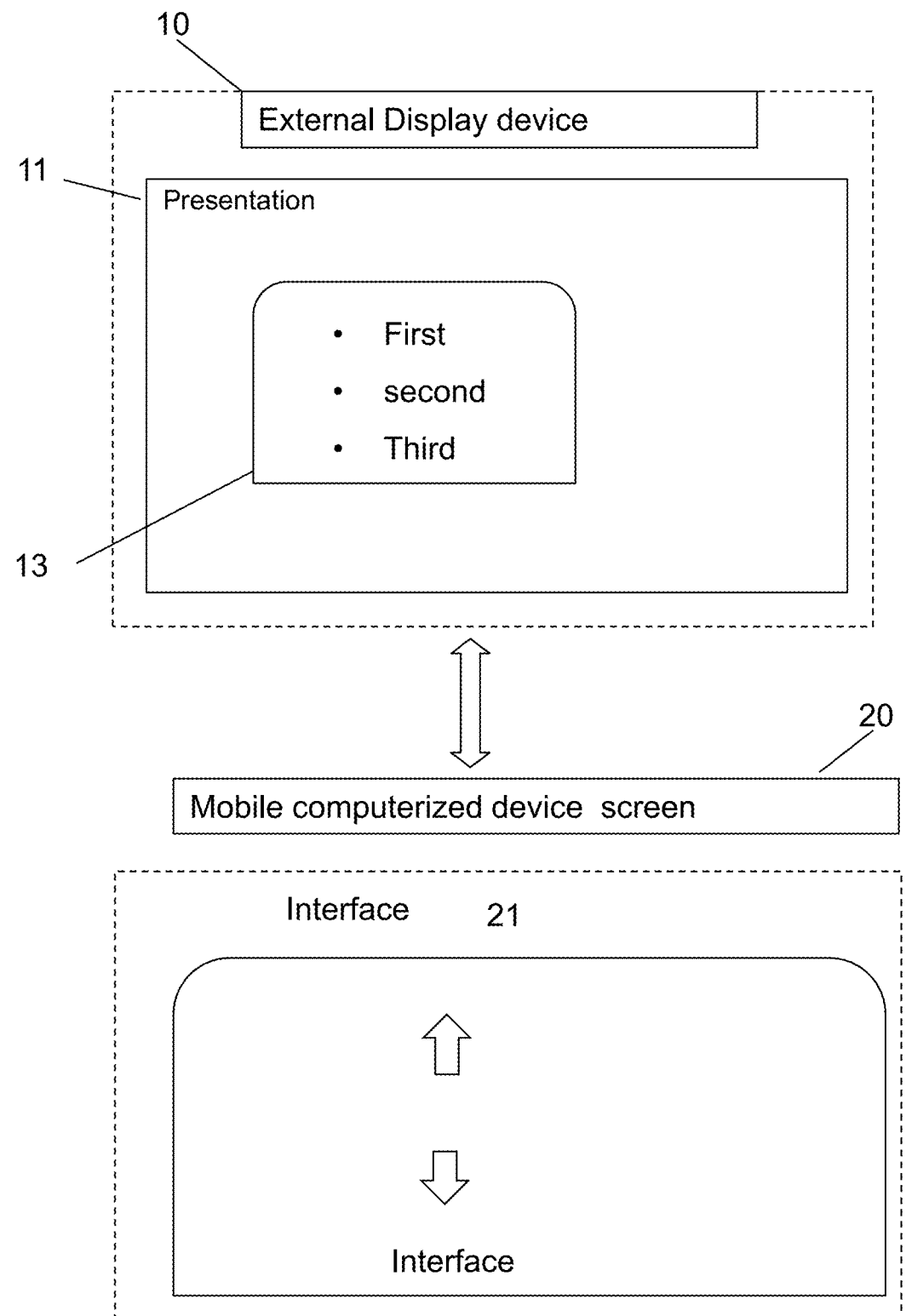
FIG. 5 is block diagram illustrating an example the screen images appearing on the external display device and the source computer device according to some embodiments of the invention.

FIG. 5 is a block diagram illustrating an example of the screen images of the multimedia file appearing on the external display device 10 and an interface appearing on the control source device 20 according to some embodiments of the invention.

As seen in the figure, presentation 11 with content items 13 appears on the external display device 10, and an interface GUI 21 including different operational buttons, such as arrows, appears on control source device 20

Figure 6:
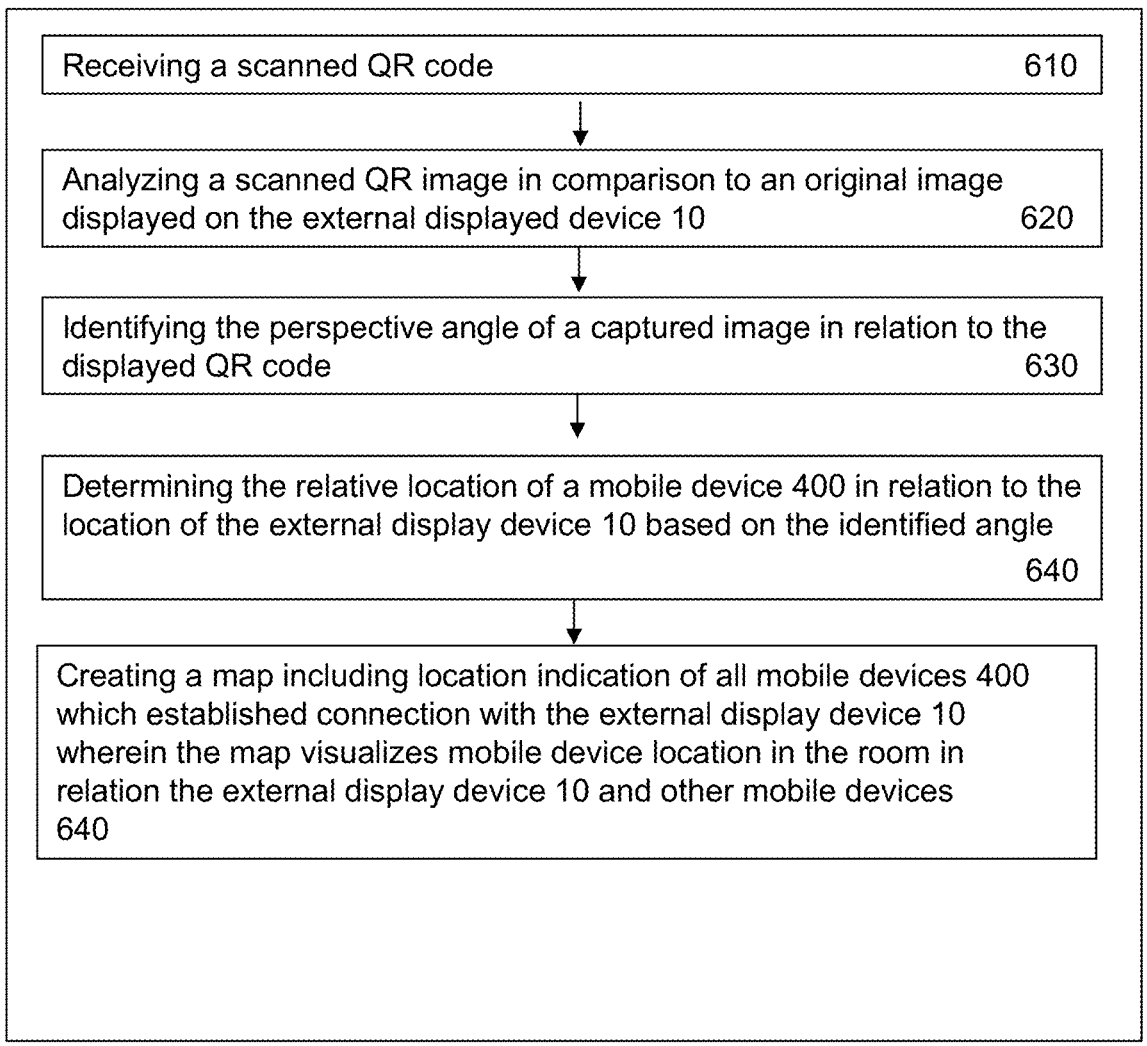
FIG. 6 is a flowchart diagram illustrating the processing of the mapping module, according to some embodiments of the invention.

FIG. 6 is a flowchart diagram illustrating the processing of a mapping module 600, according to some embodiments of the invention.

Figure 7:
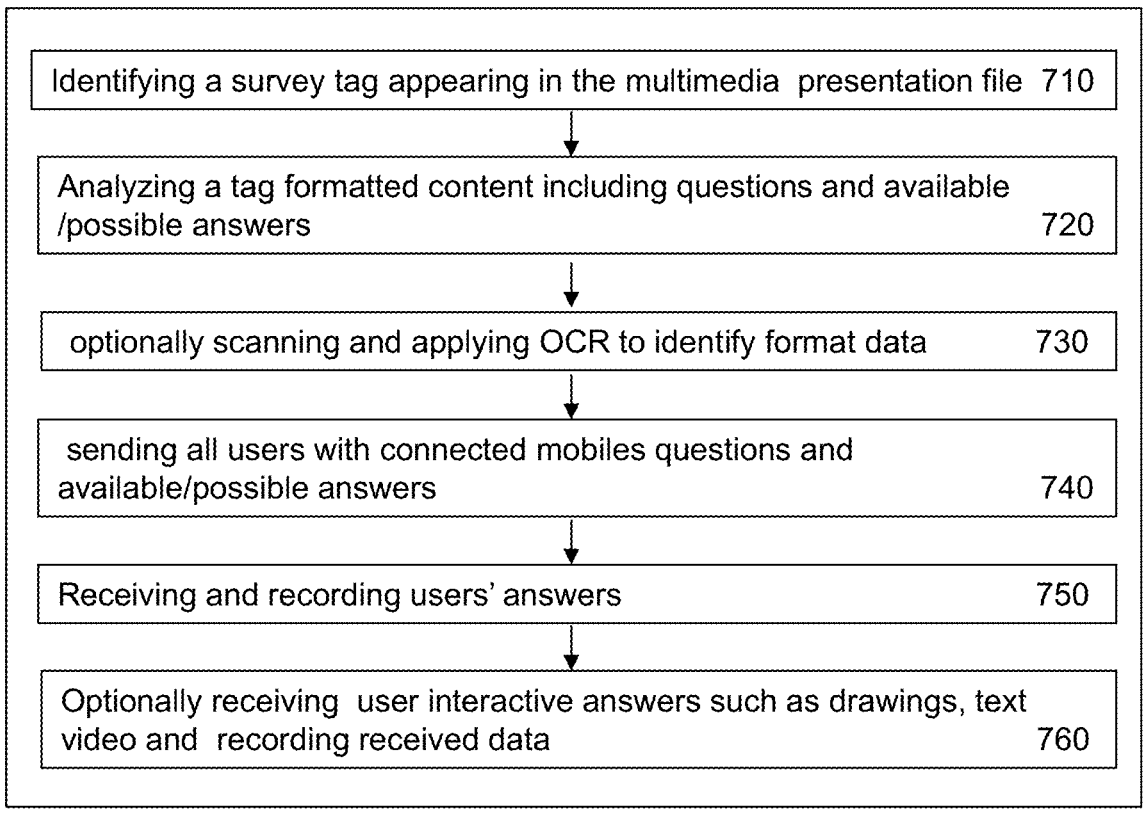
FIG. 7 is a flowchart diagram illustrating the processing of the survey module, according to some embodiments of the invention.

The processing of the Designated presentation module, e.g., of the mapping module 600, comprises the following steps:

Receiving a scanned QR code (610);

Analyzing a scanned QR image in comparison to an original image displayed on the external displayed device 10 (620);

Identifying the perspective angle of a captured image in relation to the displayed QR code (630);

Determining the relative location of a mobile device 400 in relation to the location of the external display device 10 based on the identified angle (640);

Creating a map including location indication of all mobile devices 400 that established connection with the external display device 10 (650);

FIG. 7 is a flowchart diagram illustrating the processing of a survey module 700 according to some embodiments of the invention.

Figure 8:
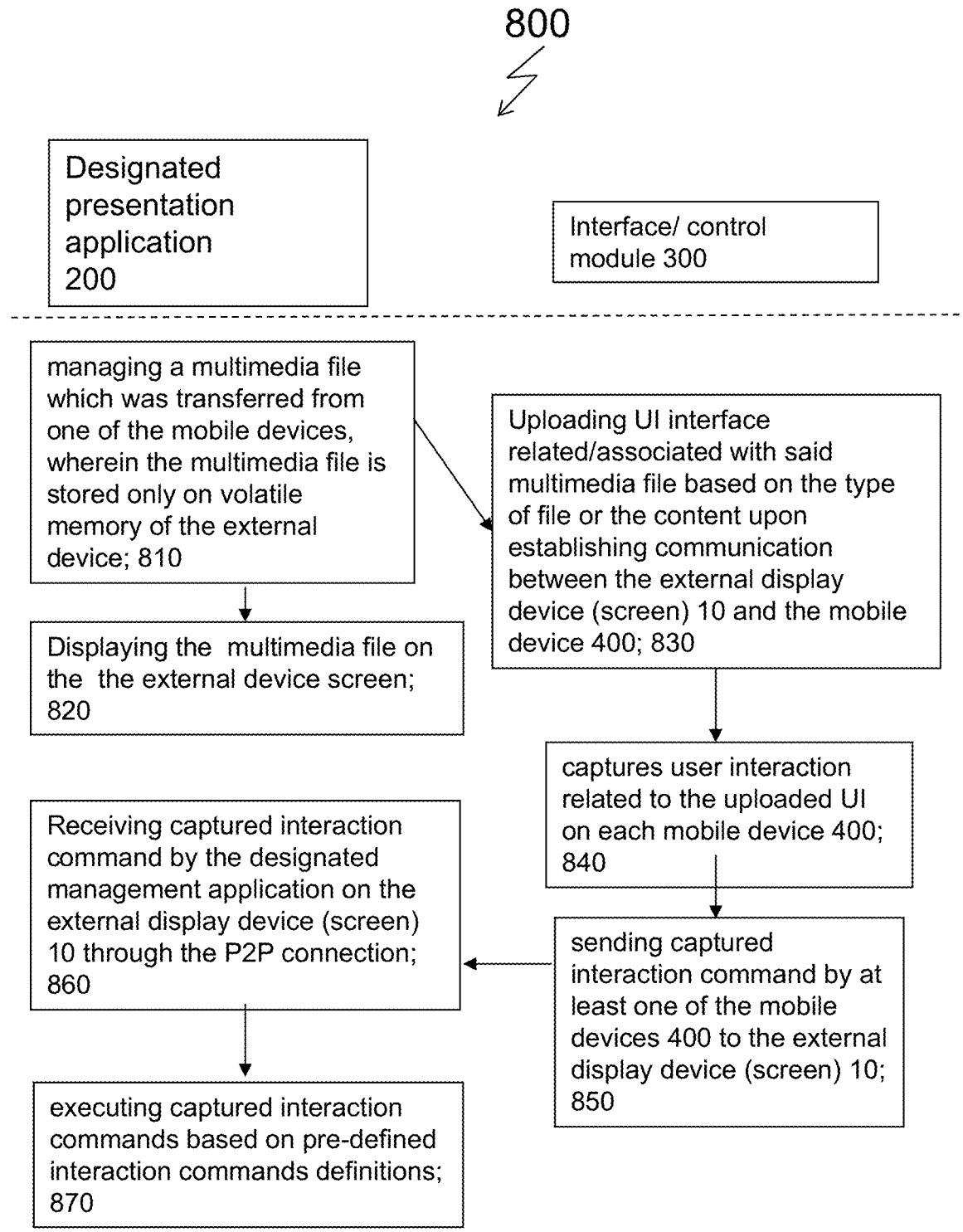
FIG. 8 is a flowchart diagram illustrating the managing a multimedia file, according to some embodiments of the invention.

The processing of the survey module 700 comprises the following steps:

The module identifies a survey tag appearing in the multimedia presentation file (710);

Analyzing a tag formatted content to identify the type of questions and to set alternative answers, for example, multi-choice answers (720);

optionally scanning and applying OCR to identify format data (730);

sending all users with connected mobiles questions and possible answers (740);

Receiving and recording users' answers (750);

Optionally receiving user interactive answers such as drawings and recording the data (760);

FIG. 8 is a flowchart diagram illustrating a procedure for managing a multimedia file 800 according to some embodiments of the invention.

The procedure for managing a multimedia file 800 comprises the following steps:

managing a multimedia file transferred from one of the mobile devices 400 on the external display device 10, wherein the multimedia file is stored only on a volatile memory of the external display device 10, wherein the external display device 10 and the mobile devices 400 are in P2P communication (810);

disapplying said multimedia file from a local memory on the external display device 10 using a designated application (820);

uploading a UI interface on the mobile device 400 which is associated with said multimedia file based on the type of file or content upon establishing communication between the mobile device 400 with the external display device 10; (830)

capturing a user interaction of uploaded UI on each mobile device 400 (840);

sending a captured interaction command by at least one of the mobile devices 400 to the external display device 10 (850);

receiving at the external display device 10 captured command/action through the P2P connection (860); and, and executing said instructions based on pre-defined definitions of interaction commands; (870).

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

Although the invention has been described in detail, nevertheless changes and modifications, which do not depart from the teachings of the present invention, will be evident to those skilled in the art. Such changes and modifications are deemed to come within the purview of the present invention and the appended claims.

The system of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention which are described in the context of separate embodiments may also be provided in combination in a single embodiment. For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

The invention claimed is:

1. A method for controlling a presentation of multimedia file on external screen device, by mobile devices, implemented by one or more processors operatively coupled to a non-transitory computer readable storage device, on which are stored modules of instruction code that when executed cause the one or more processors to perform:

transferring at least a multimedia file directly from at least one of the mobile devices to the external screen device, wherein the external screen device and mobile devices are in P2P communication;

managing the transferred multimedia file having multimedia file content using a designated presentation web-based application on the external screen device having a screen which is not part of any of the mobile devices, wherein content of the multimedia file is stored on volatile memory of the external screen device only;

displaying the content of said transferred multimedia file from local memory only on the external screen device using the designated presentation web-based application;

selecting, uploading, and displaying UI interface on each mobile device which is associated with said multimedia file based on type of file or content, upon establishing communication between the mobile device with external screen device, wherein the UI interface is not the multimedia file content, the UI interface being selected based on the type of file or content of the directly transferred multimedia file;

capturing each user interaction when using the uploaded UI on each mobile device, while at least two mobile devices are located nearby the external screen device;

sending captured interaction command by at least one of the mobile devices directly from the at least one of the mobile devices to the external screen device;

receiving at the external screen device captured command/action through the P2P connection; and executing said instructions based on pre-defined interaction commands definitions for controlling the presentation of the transferred multimedia file on the designated presentation web-based application.

2. The method of claim 1 further comprising the step of conservation of file to vectorized file format which can activate by graphical software.

3. The method of claim 1 wherein executing said capture commands include applying controlling operation according to captured control command on the displayed presentation.

4. The method of claim 1 wherein executing said commands include drawing an action based on captured drawings commands and recording the edited version of the multimedia file including the captured drawings.

5. The method of claim 1 wherein the multimedia file includes triggering visual button which triggers a predefined action when clicked during the presentation of the multimedia file.

6. The method of claim 5 wherein an action promotes all users viewing the multimedia file with question enabling the user to answer and collect user answers at the multimedia file.

7. The method of claim 6 wherein the visual button has predefined format, wherein the predefined format include data which indicates the type of questions to be sent to the client and optional answers.

8. The method of claim 7 wherein the virtual button content is scanned applying OCR process for identifying the virtual button content.

9. A system for controlling a presentation of multimedia file on external screen device, implemented by one or more processors operatively coupled to a non-transitory computer readable storage device, on which are stored modules of instruction code that when executed cause the one or more processors to perform:
- transferring at least a multimedia file directly from at least one of the mobile devices to the external screen device having a screen which is not part of any of the mobile devices, wherein the external screen device and mobile devices are in P2P communication;
- on the external screen device, for managing the transferred multimedia file using a designated presentation web-based application, wherein content of the multimedia file is stored on volatile memory of the external screen device only;
- wherein the managing includes displaying the content of said transferred multimedia file content from local memory only on the external screen device using a designated presentation web-based application;
- UI interface of at least one mobile device which is associated with said multimedia file based on type of file or content, said interface is selected, uploaded, and displayed upon establishing communication between the at least one mobile device and the external screen device, wherein the UI interface is not the multimedia file content, the UI interface being selected based on the type of file or content of the directly transferred multimedia file;
- wherein the UI interface captures user interaction related to the uploaded UI on each mobile device, sending captured interaction command by at least one of the mobile devices directly from the at least one of the mobile devices to the external screen device, while at least two mobile devices are located nearby the external screen device;
- wherein each received captured command in turn is received by the designated presentation application on the external screen device through the P2P connection; and executed based on pre-defined interaction commands definitions, for controlling the presentation of the transferred multimedia file on the designated presentation web-based application.

10. The system of claim 9 further wherein the multimedia file is translated to a vectorized file format which can activate by graphical software.

11. The system of claim 9 wherein executing said capture commands include applying controlling operation according to captured control command on the displayed presentation.

12. The system of claim 9 wherein executing of said commands include drawing action based on captured drawings commands and recording the edited version of the multimedia file including the captured drawings.

13. The system of claim 9 wherein the multimedia file includes triggering visual button which triggers a predefined action when clicked during the presentation of the multimedia file.

14. The system of claim 9 wherein an action promotes all users viewing the multimedia file with a question enabling the user to answer and collect user answers at the multimedia file.

15. The system of claim 13 wherein the visual button has predefined format, wherein the predefined format include data which indicates the type of questions to sent to the client and optional answers.

16. The system of claim 13 wherein the virtual button content is scanned applying OCR process for identifying the virtual button content.

17. A method for controlling a multimedia file on external screen device, implemented by one or more processors operatively coupled to a non-transitory computer readable storage device, on which are stored modules of instruction code that when executed cause the one or more processors to perform:
- establishing P2P connection between multiple mobile devices and the external screen device having a screen which is not part of any of the mobile devices, through communication server by using code displayed on the external screen device;
- transferring a multimedia file directly from one of the mobile devices to the external screen device, storing content of the multimedia file on volatile memory of the external screen device only;
- displaying the content of said transferred multimedia file from local memory on the external screen device using a designated presentation web-based application;
- selecting, uploading, and displaying on the mobile device which established connection with external screen device a UI interface associated with multimedia file based on type of file, wherein the UI interface is not the multimedia file content, the UI interface being selected based on the type of file or content of the directly transferred multimedia file;
- capturing user interaction related to the uploaded UI on each mobile device which established P2P communication with the external screen device, while at least two mobile devices are located nearby the external screen device;
- sending captured interaction command by at least one of the mobile devices directly from the at least one of the mobile devices to the external screen device;
- each received captured command in turn is received by the designated presentation web-based application on the external screen device through the P2P connection; and
- executing said capture commands by the designated presentation web-based application based on pre-defined interaction commands definitions for controlling the presentation of the transferred multimedia file on the designated presentation web-based application.

18. A method for controlling a presentation of multimedia file on external screen device, by mobile devices, implemented by one or more processors operatively coupled to a non-transitory computer readable storage device, on which are stored modules of instruction code that when executed cause the one or more processors to perform:
- transferring at least a multimedia file directly from one of the mobile devices to the external screen device, wherein the external device and mobile devices are in P2P communication;
- managing the transferred multimedia file using a designated presentation web-based application on the external screen device having a screen which is not part of any of the mobile devices, wherein content of the multimedia file is stored on volatile memory of the external screen device only;
- displaying said transferred multimedia file content from local memory only on the external screen device using the designated presentation web-based application;
- selecting, uploading, and displaying UI interface on at least each mobile device which is associated with said multimedia file based on type of file or content, upon establishing communication between mobile devices with external screen device, wherein the UI interface is not the multimedia file content, the UI interface being selected based on the type of file or content of the directly transferred multimedia file;

capturing each user interaction when using the uploaded UI on each mobile device;

sending captured interaction command by at least one of the mobile devices directly from the at least one of the mobile devices to the external screen device;

receiving at the external screen device captured command/action through the P2P connection; and executing said instructions based on pre-defined interaction commands definitions for controlling the presentation of the transferred multimedia file on the designated presentation web-based application.

\* \* \* \* \*

UNITED STATES PATENT AND TRADEMARK OFFICE
CERTIFICATE OF CORRECTION

| | | |
|---|---|---|
| PATENT NO. | : 11,038,955 B2 | Page 1 of 1 |
| APPLICATION NO. | : 16/726757 | |
| DATED | : June 15, 2021 | |
| INVENTOR(S) | : Joshua Glazer et al. | |

It is certified that error appears in the above-identified patent and that said Letters Patent is hereby corrected as shown below:

On the Title Page

Column 1, Inventors:, Line 2, delete "Phillip" and insert -- Philipp --, therefore.

Signed and Sealed this
Sixth Day of December, 2022

Katherine Kelly Vidal
*Director of the United States Patent and Trademark Office*